Oct. 24, 1939. B. E. BERTRAN ET AL Re. 21,241
MEANS FOR PREPARING HOLES FOR CONCRETE FOOTINGS
Original Filed Feb. 14, 1928
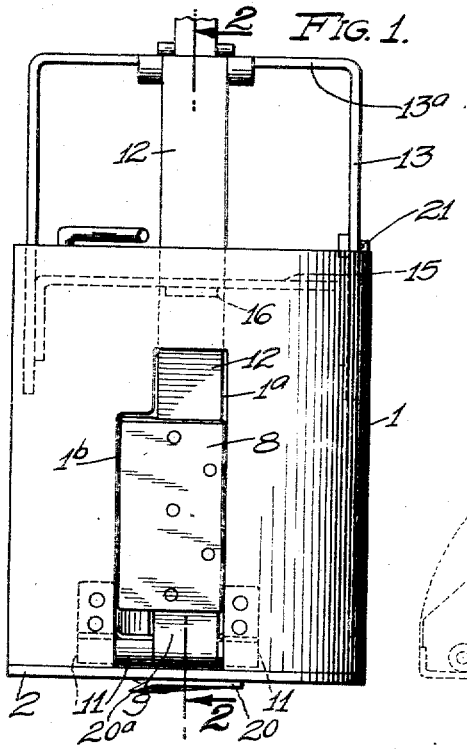
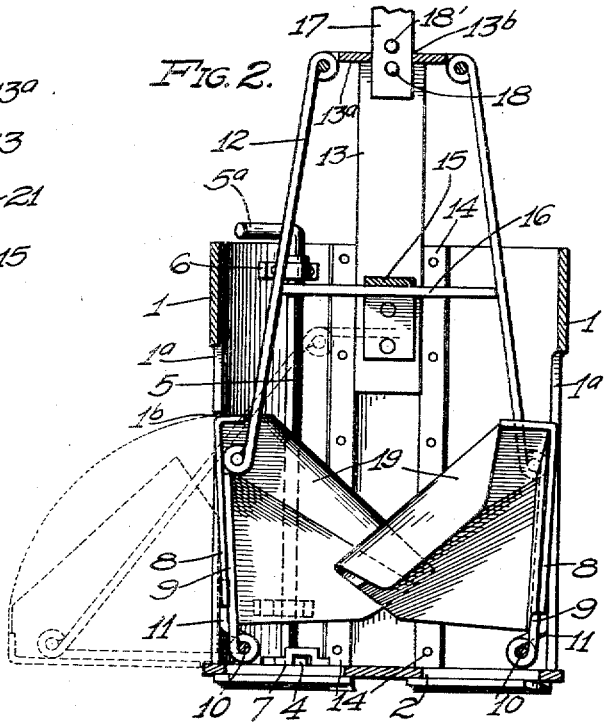
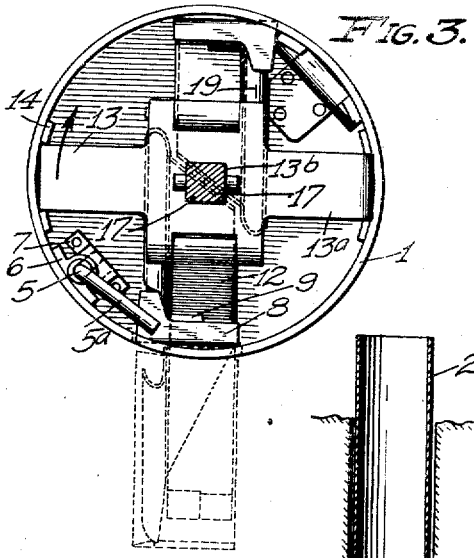
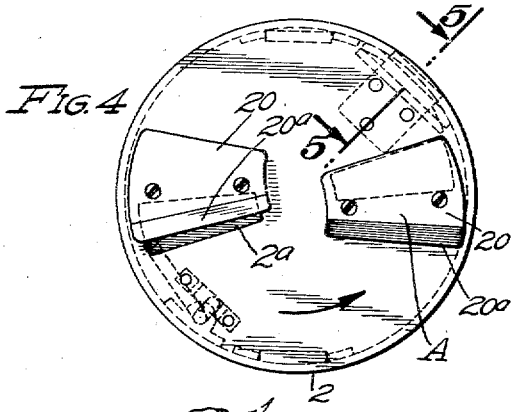
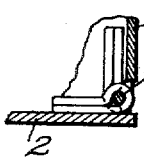
FIG. 5.
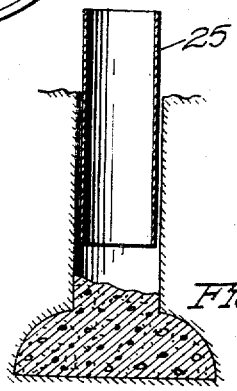
FIG 6
INVENTOR.
BENJAMIN E. BERTRAN
JOSIE A. BERTRAN
BY
A. B. Bowman
ATTORNEY Reissued Oct. 24, 1939

Re. 21,241

UNITED STATES PATENT OFFICE 21,241

MEANS FOR PREPARING HOLES FOR CONCRETE FOOTINGS

Benjamin E. Bertran and Josie A. Bertran, Los Angeles, Calif.

Original No. 1,854,823, dated April 19, 1932, Serial No. 254,220, February 14, 1928. Application for reissue July 10, 1939, Serial No. 283,715

14 Claims. (Cl. 255—76)

Our invention relates to a means for and to a method of preparing holes in the ground for concrete underfootings for buildings in which the underfootings are provided with enlarged or expanded bases; our present invention relates also to a method of making such underfootings, known also as piers for buildings.

The objects of our invention are:

First, to provide a drill capable of undercutting or underreaming the lower end of a hole in the ground, or any intermediate portion thereof, irrespective of the diameter or depth of the hole;

Second, to provide means of this class, for undercutting or expanding the lower ends of holes for concrete footings having enlarged or expanded bases, in which the upper portion of the undercut or expanded portion is inclined or rounded so as to permit free flowing of concrete to all portions of the enlarged base, and also to provide an economical large base for the footing or pier;

Third, to provide means of this class whereby the cutters, blades, scrapers, or the like, employed for undercutting or underreaming the lower end of the hole forms the undercut portion by reason of their peculiar mounting;

Fourth, to provide means of this class whereby the material loosened by the cutters, or the like, is fed to the central portion of the hole and into a bucket carrying the cutters for removing the loosened materials;

Fifth, to provide means of this class in which the cutters for undercutting or underreaming the lower ends of the holes are mounted in a bucket and are adapted to be extended therefrom for cutting purposes and also adapted to be folded inwardly for enclosing the side of the bucket, so that the cut or loosened material may be readily removed by the bucket;

Sixth, to provide novel means for actuating the cutting means and the controlling of the raising and lowering of the bucket adapted to receive the cut material from the cutters;

Seventh, to provide novel means for dumping the bucket;

Eighth, to provide means in connection with the bucket for drilling vertically simultaneously with the undercutting or underreaming operation of the drill, or a means whereby material at the bottom of the hole may be cleaned out during the undercutting or underreaming operation, or a means of this class whereby the bottom end of the main hole is flattened simultaneously with the undercutting or underreaming operation;

Ninth, to provide a means of this class whereby a hole with an enlarged or expanded base is made with the bottom face of the base substantially flat so as to provide a more solid base for the concrete footing or pier;

Tenth, to provide a novel method of preparing holes with enlarged or expanded bases for concrete footing with expanded or enlarged bases for buildings;

Eleventh, to provide a novel method of making concrete footings or piers; and

Twelfth, to provide as a whole a novelly constructed means for preparing holes with enlarged or expanded portions, and a means of this class which is simple and economical of construction, durable, efficient and positive in its action, and which will not readily deteriorate or get out of order.

With these and other objects in view, as will appear hereinafter, our invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a side elevational view of our expanding drill or means in one form for the purposes mentioned; Fig. 2 is a sectional elevational view thereof taken through 2—2 of Fig. 1 showing certain parts in elevation to facilitate the illustration and showing certain parts shifted to their extended or expanded positions by dotted lines; Fig. 3 is a top view thereof also showing by dotted lines one of the cutters and associated members in their extended positions; Fig. 4 is a bottom view thereof; Fig. 5 is a fragmentary sectional view taken at 5—5 of Fig. 4 showing the hinge connection between the bottom and the main portion of the bucket; and Fig. 6 is a sectional view on a reduced scale showing the approximate shape of the hole adapted to be made by our expanding drill and also showing the method of pouring the concrete in the hole for making a concrete underfooting or pier.

Like characters of reference refer to similar parts and portions throughout the views of the drawing.

Our expanding drill, as shown in the drawing, consists of a receptacle, or bucket, on which are mounted the cutters or blades. The bucket consists preferably of a cylindrical casing 1 of heavy weight and a cover plate 2 positioned preferably against the bottom end of the cylindrical casing. The cover plate 2 is hinged at its edge, by a pin 3, to the lower end of one side of and within the cylindrical casing 1. The cover plate is normally held against the lower end of the cylindrical casing by a latch member, or lug, 4 which is secured to the lower end of a latch rod 5 which is rotatably mounted by straps or journals 6 against the inner side wall of the casing 1. The latch member or lug 4 is adapted to extend under a U shaped strap 7 secured to the inner side of the cover plate 2. The upper end of the latch rod 5 is provided with a handle 5a which is adapted to rotate the rod 5 and the latch 4 for engaging the latter with and disengaging the same from the strap 7, the handle 5a being positioned within the circumference of the casing 1 when the latch engages the strap, as shown. The cutters or blades 8, for cutting or removing the material, and forming the expanded or undercut portion of the hole, are mounted on relatively wide straps or links 9 which are pivotally mounted at one end on pins 10 positioned within the cylindrical casing near its lower end and are supported by brackets 11 secured to the inner side walls of the cylindrical casing member 1. To the opposite ends of the straps or links 9, are pivotally connected the normally lower ends of other straps or links 12 which are pivotally connected at their upper ends to the opposite sides of the middle portion of the horizontal or cross connecting portion 13a of a U shaped frame member 13. The legs of the frame member 13 extend downwardly from the horizontal portion 13a and are reciprocally mounted within the cylindrical casing 1 against the inner side wall thereof and are guided in their vertical movements by guide members 14 secured to the inner side walls of the cylindrical casing at the opposite edges of the legs of the U shaped member 13. To the legs of the member 13, and between the upper and lower ends thereof, is secured a horizontal support 15 at the middle portion of which is secured a stop member 16 in the form of a strap which is adapted to limit the inward movement of the links 12 about their pivotal axes at their upper ends.

At the middle portion of the cross connection or horizontal portion 13a of the U shaped member 13 is provided a polygonally shaped, preferably square hole 13b into which is adapted to be extended the operating rod 17 of similar cross section. Through the end of the rod 17 extending through the member 13, is secured a pin 18 which is adapted to engage the under side of the portion 13a for raising the whole apparatus out of the hole and also for raising the links 12 for drawing the links 9 inwardly to the position shown by solid lines in Fig. 2, the stop member 16 limiting both the inward positions of the links 12 and 9 so that the pivotal connection between each set of links is held outside of the line connecting the pivotal axes of the opposite ends of the links so that the links and cutters may be shifted outwardly to the dotted line position in Fig. 2 without difficulty. The cutters are shifted outwardly about their pivotal axes by the weight of the cutters, the links 9 and 12 and the frame 13, but the outward shifting of the cutters may be facilitated by the rod 17, either by another pin engaging the upper side of the frame 13, or by the inward shifting of the rod 17 until the same engages the supporting member 15.

The cutters 8, which consist preferably of flat plates, are secured to the outer sides of the links 9 when the same are positioned in their withdrawn positions, as shown by solid lines in Fig. 2. These cutters are preferably wider than the links 9 and extend beyond the forward edges thereof (relative to their direction of rotation) and also extend beyond the free ends of the links. The portions extended beyond the free ends of the links are bent upwardly (considering the positions of the cutters when extended) for forming the side walls or contour of the expanded base of the hole. Both the main portions of the cutters and the portions bent at an angle thereto, are provided with cutting edges. The material cut or loosened by the cutters is directed into the bucket by deflector plates 19 which are secured to the upper sides of the cutters and the links 9 and also to the bent portions of the cutters. When considering the cutters in their expanded horizontal positions, as shown by dotted lines in Figures 2 and 3, the deflector plates 19 extend upwardly and at an angle toward the cylindrical casing 1 are positioned in front of the links 12 with their outer portions but the portions of the deflectors 19, which are positioned inwardly from the links 12, are bent behind the links 12, as shown best in Figs. 2 and 3.

It will be here noted that the side walls of the cylindrical casing 1 are provided with longitudinal openings 1a to permit the links 12 to be extended outwardly for extending the cutters. At one side of the openings 1a are provided other cut out portions 1b forming, together with the openings 1a openings somewhat wider than the width of the cutters. When the cutters are drawn inwardly, as shown by solid lines in Figs. 1, 2 and 3, the material cut or loosened by the cutters, and not already directed inwardly by the deflectors 19, is forced into the bucket by the cutters and packed therein, and the openings 1a and 1b closed by the cutters.

The cover plate 2 is provided with segmental openings 2a. Over these openings, at the underside of the plate 2, are secured cutters 20 with cutting edges directed downwardly opposite the openings 2a so that the ground formation under the drill is cut downwardly and the cut material directed through the openings 2a into the bucket.

When desiring to use the apparatus for drilling vertical holes only, the cutters 8 are locked in their folded or withdrawn positions, as shown by dotted lines in Figs. 1, 2 and 3, by a pin 21 extending through one, or both, of the legs of the U shaped frame 13. This pin engages the upper edge of the cylindrical casing 1 and prevents the frame 13 from being forced inwardly and the cutters from being forced outwardly through the side walls of the bucket.

When desiring only to undercut or underream the lower end of the hole, one of the cutters 20 is reversed with the cutting edge against the bottom side of the plate 2 and secured over the one opening 2a. The cutter thus reversed prevents downward cutting of the apparatus, while the other cutter permits the continuous cleaning of the bottom of the hole.

It will be here noted that the arrangement of the several elements, as shown and described, provides an apparatus whereby the bottom of the hole is substantially flat providing a flat base or face at the lower end of the underfooting or pier.

It will also be noted that with our apparatus a hole can be drilled into the ground of such a size which is inaccessible to man and the lower end thereof undercut so as to provide a large base for the underfooting or pier of relatively small diameter. It will also be noted that with this apparatus, the lower ends of large diameter or large diameter and deep holes may be easily, quickly and economically undercut without the necessity of constructing forms to hold in the side walls of the hole against the caving in upon a human being at the bottom of the hole. It will also be noted that no larger hole than the required diameter need be made in order to undercut or form a large base at the bottom of the hole.

By means of our invention, an underfooting or pier may be made without forms, irrespective of size and diameter of the hole, by pouring in the concrete directly into the hole, the only additional equipment being required to keep the dirt out of the concrete and to prevent the possibility of the dirt caving in upon the concrete, is a spouting 25 which is inserted into the hole and withdrawn as the concrete is poured thereinto.

Though we have shown and described a particular construction, combination and arrangement of parts and portions for undercutting or underreaming the lower ends of holes in the ground, and a certain method of preparing holes with enlarged base portions for concrete footings or piers, and a method of making such concrete footings or piers, we do not wish to be limited to this particular construction, combination and arrangement, nor to the method particularly described, but desire to include in the scope of our invention, the construction, combination and arrangement or parts and portions of the apparatus and the method, substantially as set forth in the appended claims.

Having thus described our invention, what we claim as new and desire to secure by Letters Patent is:

1. In a means of the class described, a bucket having longitudinal vertical openings in the side wall thereof, cutters pivotally mounted on a horizontal axis within and near the lower end of the bucket and shiftable outwardly therefrom in a vertical plane.

2. In a means of the class described, a bucket having longitudinal vertical openings in the side wall thereof, cutters pivotally mounted on a horizontal axis within and near the lower end of the bucket and shiftable outwardly therefrom in a vertical plane, and deflectors carried by said cutters for deflecting the material cut by said cutters into said bucket.

3. In a means of the class described, a bucket having longitudinal openings in the side wall thereof, cutters pivotally mounted on horizontal axes within and near the lower end of the bucket and shiftable outwardly therefrom, said cutters being foldable upwardly about said axes for enclosing the openings in the side wall of the bucket.

4. In a means of the class described, a bucket, a cutter mounted within the bucket and shiftable beyond the side wall thereof and foldable within the bucket for enclosing the side wall thereof, and means for rotating said bucket, said means being slidable downwardly with respect to said bucket, shiftable cross connection means connecting the rotating means to the cutter for shifting said cutter outwardly when the rotating means is shifted downwardly, said means when shifted upwardly being adapted to fold said cutter inwardly into said bucket, and for raising said bucket.

5. In a means of the class described, a bucket having a longitudinal opening in the side wall thereof, a cutter pivotally mounted on a horizontal axis at one end within and at the lower portion of said bucket and foldable outwardly therefrom and upwardly about said axis to enclose the opening in the side wall thereof, a frame for raising and lowering the bucket, said frame being reciprocally mounted in said bucket and connected to said cutter, said cutter being foldable outwardly when said frame is shifted downwardly and upwardly when said frame is raised, said frame being adapted for raising said bucket.

6. In a means of the class described, a bucket having a longitudinal vertical opening in the side wall thereof, a cutter pivotally mounted on a horizontal axis within the bucket with its one end on and near the lower end of the side wall of the bucket and shiftable outwardly therefrom in a vertical plane.

7. In a means of the class described, a bucket having cutters pivotally mounted on a horizontal axis thereon and shiftable about the axis beyond the extremities of the bucket into substantially the plane of the bottom of the bucket, said cutters having cutting portions at one edge forming, when the cutters are shifted into the plane of the bottom, a continuous cutting means from the bucket to the extended ends of the cutters, and deflectors in connection with and at the rear edges of said cutters and shiftable therewith.

8. In a means of the class described, a bucket having an opening at the lower portion of its side wall and having a cutter mounted on a horizontal axis therein and shiftable about said axis beyond the extremities of the bucket into substantially the plane of the bottom of the bucket through the opening, said cutter having a cutting portion at one edge forming, when the cutter is shifted into the plane of the bottom, a continuous cutting means from the bucket to the extended end of the cutter, said cutter, being foldable inwardly for enclosing the opening in the bucket.

9. In a means of the class described, a bucket, a cutter mounted thereon and shiftable beyond the side wall thereof, means for rotating the bucket and shiftable cross connection means connecting the cutter to the rotating means, the former means, by its weight, being adapted to shift said cutter outwardly.

10. In an underreamer, a bucket, and a cutter pivotally mounted at one end at the lower end of the bucket and tiltable about its pivotal axis outwardly in substantially a vertical plane beyond the side wall thereof and shiftable with its cutting portion substantially to the plane of the bottom of the bucket.

11. In a means of the class described, a relatively long bucket provided with a longitudinal vertical opening in its side wall and extending to the bottom of the side wall, a cutter shiftably mounted within the bucket and projectible through the opening in a substantially vertical plane for undercutting a hole to larger diameter than the diameter of the bucket, said bucket serving as a guide in said hole for said undercutting and for receiving and directly containing the material cut, and a deflector for directing the material cut by the cutter into the bucket.

12. In a means of the class described, a guide means adapted to receive and directly contain the material cut and provided with an opening in its side wall, a cutter shiftably mounted within the guide means and projectible therefrom in a vertical plane through said opening to a position substantially flush with the lower end of the guide means for underreaming a hole at the lower end thereof substantially flush with the bottom of the hole and a deflector for directing the material cut by the cutter into the bucket and discharging the same directly thereinto.

13. In a means of the class described, a bucket, a cutter mounted within the bucket and shiftable beyond the side wall thereof and foldable within the bucket for enclosing the side wall thereof, a frame for raising and lowering the bucket, said frame being reciprocably mounted in said bucket and connected to said cutter, said cutter being foldable outwardly when said frame is shifted downwardly and upwardly when said frame is raised.

14. In a means of the class described, a bucket, a cutter mounted within the bucket and shiftable beyond the side wall thereof and foldable within the bucket for enclosing the side wall thereof, and means for rotating said bucket, said means being slidable downwardly with respect to said bucket, shiftable cross connection means connecting the rotating means to the cutter for shifting said cutter outwardly when the rotating means is shifted downwardly, said means when shifted upwardly being adapted to fold said cutter inwardly into said bucket.

BENJAMIN E. BERTRAN.
JOSIE A. BERTRAN.